(12) United States Patent
Ungerechts et al.

(10) Patent No.: US 9,051,135 B2
(45) Date of Patent: Jun. 9, 2015

(54) CONVEYING DEVICE FOR POWDERED AND/OR GRANULATED MATERIAL AND MIXTURES OF THIS MATERIAL WITH LIQUIDS

(75) Inventors: Herbert Ungerechts, Kerken (DE); Hans-Jörg Frank, Tönisvorst (DE); Markus Hagedorn, Mülheim/Ruhr (DE)

(73) Assignee: Bayer MaterialScience AG, Leverkusen (DE)

( * ) Notice: Subject to any disclaimer, the term of this patent is extended or adjusted under 35 U.S.C. 154(b) by 544 days.

(21) Appl. No.: 13/429,914

(22) Filed: Mar. 26, 2012

(65) Prior Publication Data

US 2012/0251249 A1  Oct. 4, 2012

(30) Foreign Application Priority Data

Mar. 30, 2011 (EP) ..................................... 11160515

(51) Int. Cl.
*B65B 1/32* (2006.01)
*B65G 69/18* (2006.01)
*B65G 11/12* (2006.01)
*B65G 11/18* (2006.01)

(52) U.S. Cl.
CPC ............... *B65G 69/181* (2013.01); *B65B 1/32* (2013.01); *B65B 2210/06* (2013.01); *B65G 11/126* (2013.01); *B65G 11/186* (2013.01)

(58) Field of Classification Search
CPC .............. B65B 1/04; B65B 1/06; B65B 1/32; B65B 2210/06; B65B 2210/08

USPC .............................. 141/1, 83, 89–91, 94, 231
See application file for complete search history.

(56) References Cited

U.S. PATENT DOCUMENTS

| | | | | | |
|---|---|---|---|---|---|
| 3,430,639 | A | * | 3/1969 | Roberts | 141/91 |
| 3,944,090 | A | * | 3/1976 | Flood | 141/35 |
| 4,125,195 | A | * | 11/1978 | Sasadi | 141/284 |
| 4,334,900 | A | * | 6/1982 | Neumann | 55/350.1 |
| 5,749,470 | A | * | 5/1998 | Operschall et al. | 209/2 |
| 5,881,780 | A | * | 3/1999 | Matye et al. | 141/232 |
| 8,622,187 | B2 | * | 1/2014 | Ungerechts et al. | 193/15 |
| 8,783,465 | B2 | * | 7/2014 | Ungerechts et al. | 209/137 |
| 2005/0034957 | A1 | * | 2/2005 | Bonita | 193/2 R |
| 2012/0247915 | A1 | * | 10/2012 | Ungerechts et al. | 193/15 |
| 2012/0248012 | A1 | * | 10/2012 | Ungerechts et al. | 209/137 |
| 2012/0251246 | A1 | * | 10/2012 | Ungerechts et al. | 406/34 |
| 2012/0251247 | A1 | * | 10/2012 | Ungerechts et al. | 406/34 |

FOREIGN PATENT DOCUMENTS

DE           195 272 40  C1    9/1996

* cited by examiner

*Primary Examiner* — Nicolas A Arnett
(74) *Attorney, Agent, or Firm* — Drinker Biddle & Reath LLP

(57) ABSTRACT

A conveying device for a mixture of free-flowing finely divided solid materials, in particular for powdered and/or granular (mixed) material, especially polymer granules with a liquid includes a telescopic pipe which is vertically arranged and can be flexibly fitted for conveying a mixture of preferably polymer granules with a liquid, for example for flushing a contaminated conveying device.

12 Claims, 3 Drawing Sheets

CONVEYING DEVICE FOR POWDERED AND/OR GRANULATED MATERIAL AND MIXTURES OF THIS MATERIAL WITH LIQUIDS

BACKGROUND OF THE INVENTION

1. Priority

Priority is claimed to European Patent Application No. 11 160 515.0, filed Mar. 30, 2011, the disclosure of which is incorporated herein by reference in its entirety.

2. Field of the Invention

The field of the present invention is conveying devices for mixtures of free-flowing finely divided solid materials, in particular for powdered and/or granular (mixed) material, especially polymer granules with a liquid, and particularly a telescopic pipe which is vertically arranged and can be flexibly fitted for conveying a mixture of preferably polymer granules with a liquid, for example, for flushing a contaminated conveying device.

3. Background

The granular product occurring in the reactor during the production of thermoplastics is plasticated in an extruder and formed into individual strands, which are cut into granules by means of a knife rotating in the granulating die. This product may be provided with further components in a further step by compounding.

Compounding is the term used in polymer preparation for producing the finished moulding compound from the raw plastics materials with the addition of fillers, reinforcing agents, plasticizers, coupling agents, lubricants, stabilizers, etc. The compounding is mainly performed in extruders and comprises the process operations of conveying, melting, dispersing, mixing, degassing and building up pressure.

During the granulation, the melt is then forced through the orifices of a die plate, so that subsequently, in the case of strand granulation, initially melt strands are produced, and then during the granulation these strands are turned into cylindrical granules, or else, in the case of die-face granulation, the strands are cut off directly as they emerge at the die plate and are turned into lenticular or spherical granules. The granulation may be performed, for example, in a stream of liquid, which cools the granules and largely avoids agglomeration. The granules are subsequently dried and screened.

Following the granulation after production or after compounding, the product is generally conveyed pneumatically to a silo or bunker. Subsequently, the bulk material is removed from the silos or bunkers and filled into containers or silo vehicles, or the bulk material is put into big bags, such as octabins oder sacks. In each of these steps, dust/coatings may occur, for example due to abrasion, and may in addition to the bulk material itself then cause contamination when there is a change of the bulk material.

Typical bulk materials are, for example, building materials, such as top soil, sand, gravel, ballast or cement, other mineral materials, such as ore or gritting salt, and foods, such as grain, sugar, table salt, coffee or flour, and also powdered materials such as pigments, fillers, granules, pellets, etc.

At the same time, there is an ever increasing need for flexibility, so that in a filling plant devices can be exchanged as and when required. For example, in the case of a bulk material, there may be the requirement for a classifier (dedusting unit), in order to remove fine particles, while for other bulk materials only a conveying pipe is necessary. Moreover, the investment costs are not inconsiderable, and so a flexible solution, for example for using a conveying pipe at different locations of a plant, is made possible.

DE 195 272 40 C1 describes a conveying device, wherein a portion of the conveying line is arranged exchangeably between two abutments spaced rigidly apart and the exchangeable section of conveying line is formed telescopically under the action of a tension spring, and the ends of the telescopic arrangement are supported on the abutments. A disadvantage is the design-related effort correspondingly required for cleaning to avoid contamination as soon as a different solid material is transported, in particular in the pipe-flange region and in the pipe interior.

The requirement for easy exchangeability of buffering and conveying devices before filling or transporting a different type of bulk material is, however, being demanded increasingly frequently.

SUMMARY OF THE INVENTION

The problem addressed by the present invention is therefore that of overcoming the disadvantages of the prior art.

Since the prior art does not present an adequate solution to this problem, a conveying device is provided which makes a connection possible between different levels that are arranged at different heights vertically one above the other. The aim is for a solid-liquid mixture from cleaning processes coming from different regions of one level to be passed on to the levels lying therebelow. These telescopic conveying pipes are capable of being used in particular at different positions within a filling building to be flushed, and for this purpose to be able to be fitted exchangeably and easily but nevertheless reliably.

BRIEF DESCRIPTION OF THE DRAWINGS

In the drawings, wherein like reference numerals refer to similar components.

DETAILED DESCRIPTION OF THE PREFERRED EMBODIMENTS

Figure 1:
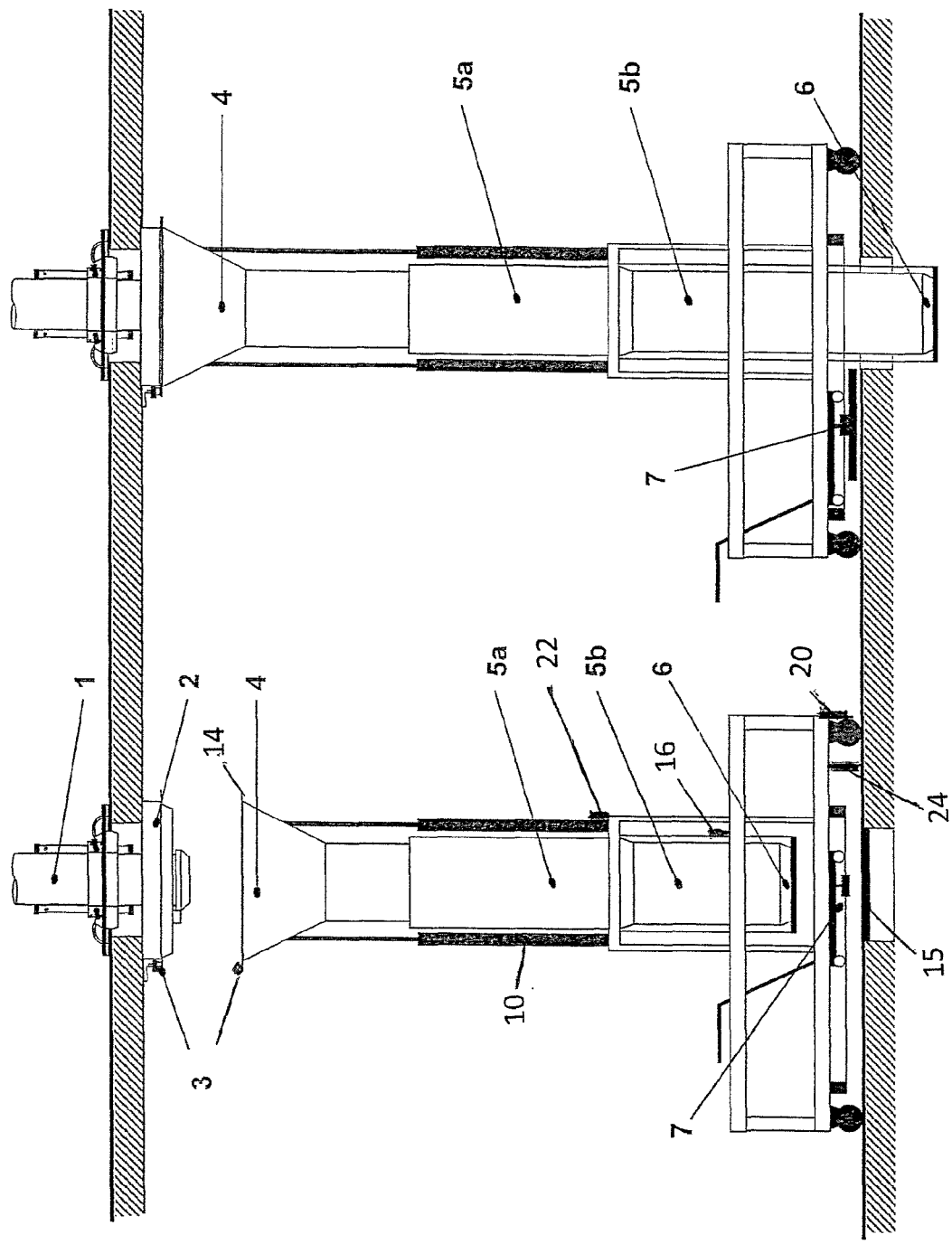
FIG. 1 shows a telescopic conveying pipe in the retracted state and in the docked state.

A conveying device which meets the defined object includes a telescopic conveying pipe and has the following features:

a) arrangement of the telescopic pipe (5*a*) on a mobile frame for transporting the pipe to different cleaning points on a platform, the mobile frame comprising a lifting/lowering device (10) for positioning the pipe at different docking devices on the platform b) a funnel (4) at the inlet of the telescopic pipe, with a docking collar (14) for mounting onto the ceiling centering means (2)

c) a ceiling centering means (2) with an initiator or sensor (3) for the automatic detection of a funnel docking d) a flushing tube (5*b*) with a lifting/lowering device (16)

e) a lifting/moving device (7, 8) for the reliable removal of the bottom cover (15).

The telescopic conveying pipe is not a rigid pipe, but consists of two or more pipe segments—which do not necessarily have to have a cylindrical form, but may also have a polygonal cross section—which are put together and can be displaced in one another (see FIG. 1). This produces a conveying pipe of a length which can be varied by telescopically pushing the interconnected pipe segments into one another or pulling them apart.

Figure 3:
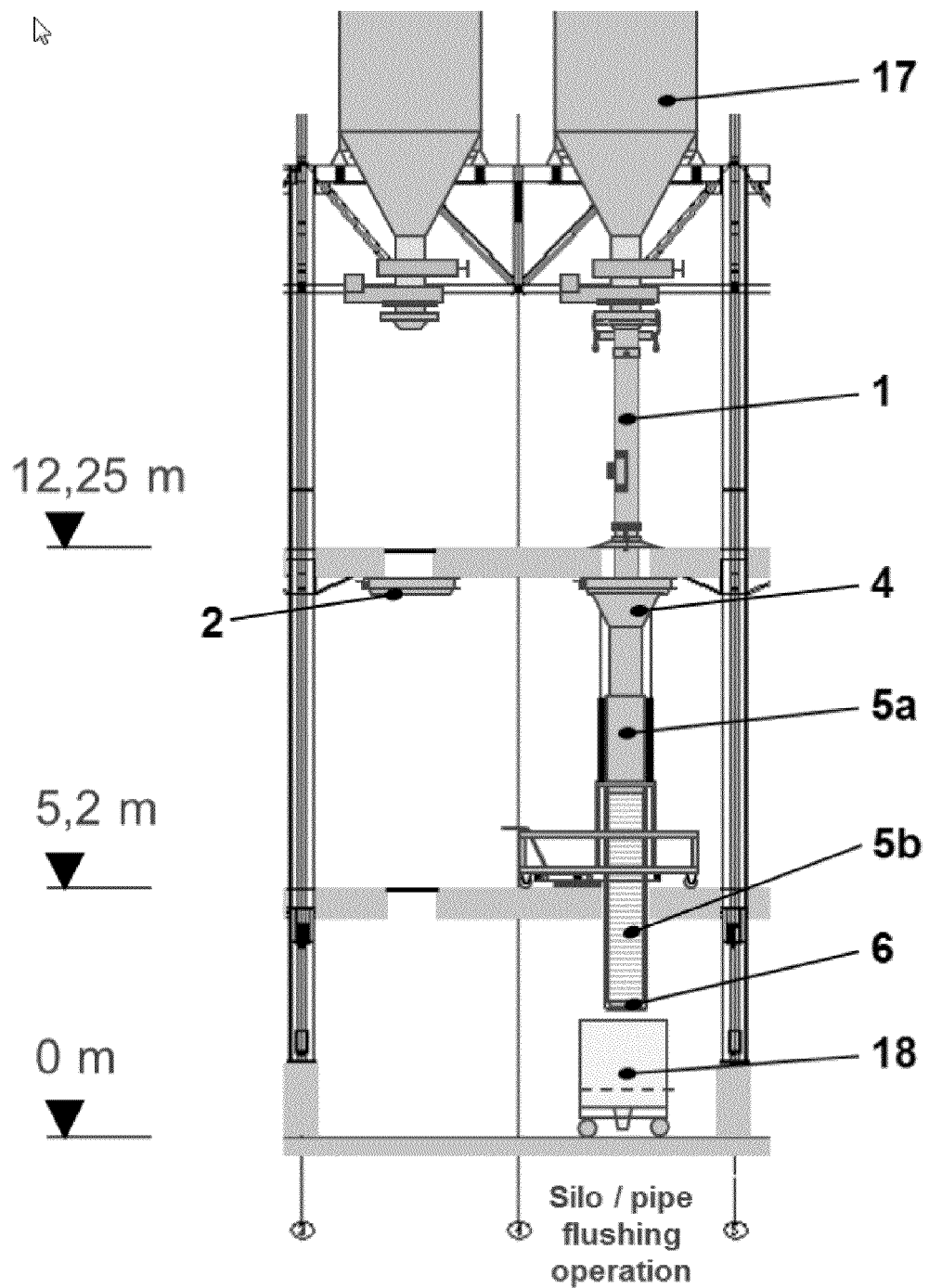
FIG. 3 shows the use of a telescopic conveying pipe by the example of silo flushing.

One possible working procedure that is effectively supported by the telescopic conveying pipe disclosed herein (FIG. 1) is explained below by the example of silo flushing (also see FIG. 3).

Here, for example, an emptied but previously granule-carrying silo (17) is connected to a rigid solid-material conveying pipe (1), and the pipe outlet flange thereof ends in a telescopic conveying pipe (5a, 5b). The pipe outlet flange (6) thereof reaches into a collecting filter carriage (18) for flushing solutions. The flushing process can then begin via the silo (17), preferably with pure water, which is collected in the lowermost filter carriage (18) as flushing solution. In this way, a pipe connection which is stable but nevertheless can be fitted quickly and flexibly can be installed over a distance of three platforms of the building, a connection which satisfies the requirements for sealing and carries the flushing water away reliably and without leakages into a filter carriage on the lowest platform of the building.

The telescopic conveying pipe (5a, 5b) itself is positioned manually with the aid of a ceiling centering means (2). As this happens, the funnel (4), which is driven and controlled from the lower platform, moves into sealed engagement on the ceiling centering means (2), so that the necessary sealing for the flushing process is obtained. An initiator or sensor (3) at the ceiling centering means (2) detects correct coupling of the flushing funnel with its docking collar (14), whereby only then is a go-ahead given to allow flushing. Similarly, the flushing tube (5b) with the outlet flange (6) is moved by tube lifting/lowering device 16 through the bottom opening into the collecting filter carriage (18). The bottom cover is previously lifted out of the bottom opening and displaced by means of an integrated traveling carriage (7, FIG. 2) and a lifting magnet (8). To safeguard against personnel falling, the mobile telescopic conveying pipe (5a, 5b) is braked, and consequently cannot be moved. The brake (20) can only be released again when the initiator at the lifting magnet (8) does not detect a bottom cover.

This arrangement has enormous advantages over the flexible tubes otherwise customarily used with regard to the requirements for work safety, cleanness and flexibility, flexibility meaning in particular quick fitting.

In a preferred embodiment, the flushing tube (5b) is foldable and deployable. This kind of tube is also known as compact flushing tube or filling hose or delivery hose.

In a preferred embodiment, the flanges or mating flanges of the telescopic conveying pipe may possibly additionally include sensors, such as the initiator (3) shown by way of example in FIG. 1, which indicate the position of the flange of a docking device by a so-called initiator enquiry, and consequently reliably detect a correct docking operation in an automated manner. Such initiators are commercially available devices and are sold, for example, under the designation NCB15-30GM40-N0-V1 by the company Pepperl and Fuchs.

As used herein, the wordings sensor and initiator are synonymous.

On account of its dimensions and its dead weight, the telescopic conveying pipe generally cannot be readily handled manually, in particular not during the docking maneuvers, which require high precision. In order to facilitate this handling, in a preferred embodiment the telescopic conveying pipe is brought into the desired working position with the aid of a mobile frame, as schematically represented by way of example in FIG. 1.

The telescopic conveying pipe can be docked without any problem with the aid of the mobile frame described above (FIG. 1) and the flushing tube can be lowered through a bottom opening, so that apparatuses and devices can be reliably connected to one another even over a distance comprising more than one platform level.

The working platform is suitable for moving the telescopic conveying pipe from one location to the other. Since this working platform can be moved, the telescopic conveying pipe can in this way be fitted very flexibly at different filling positions. In a preferred embodiment, the lifting and lowering devices (in particular the mobile telescopic part) can be assisted mechanically or electrically, for example by pneumatic drives (22).

Optionally, the entire frame may be moved by drives (24), preferably electrical drives, possibly locationally movable drives. Locationally movable drives, i.e. drives which can be moved around independently and can be uncoupled from the material transported, have the advantage that they can be used for different transporting tasks. This so-called small tractor or mover can be connected by a lifting mechanism, including an adaptation arm, with interlocking engagement onto the frame of the working platform. This allows the operator to accelerate, brake and steer the working platform by way of a driven pivotable third wheel of the mover. However, drives that are fixedly connected to the working platform may also be used.

For further work safety, in a further preferred embodiment a separate lifting/moving device (7), for example with an electrical load magnet (8), is used for the opening of the bottom cover (if present), to secure the bottom opening. The initiators are commercially available devices.

Figure 2:
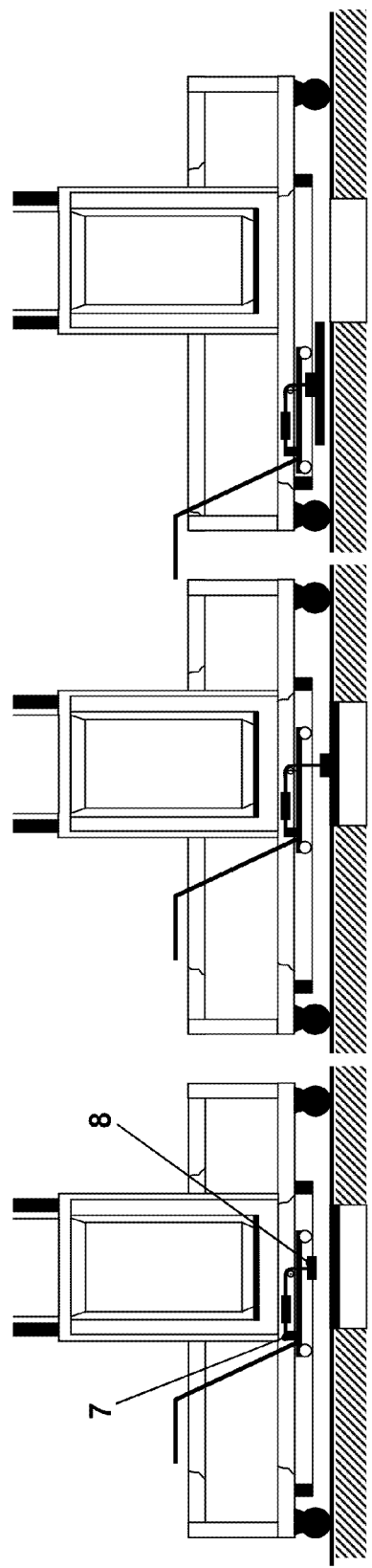
FIG. 2 shows a bottom cover lifting and moving device with the individual working steps.

Preferred therefore is a cover lifting device (7 and 8) which is fixedly connected to the mobile frame for the telescopic conveying pipe and with the aid of which covers that are present in bottom openings of building platforms can be raised and possibly put to one side, in order that the flushing tube can be led through the exposed bottom opening. The cover lifting device (7 and 8) is in this case integrated in the mobile frame in such a way that the lifting mechanism is effective directly under the tube outlet flange. The structural design and operating mode of such a cover lifting device are illustrated by FIG. 2.

This cover lifting device (7 and 8) may in principle also be used as a separate, possibly mobile device.

Thus, a conveying device is disclosed. While embodiments of this invention have been shown and described, it will be apparent to those skilled in the art that many more modifications are possible without departing from the inventive concepts herein. The invention, therefore, is not to be restricted except in the spirit of the following claims.

What is claimed is:

1. A conveying device comprising a telescopic conveying pipe and
   a) arrangement of the conveying pipe (5a) on a mobile frame for transporting the conveying pipe to different cleaning points on a platform, the mobile frame comprising a pipe lifting/lowering device connected to the pipe for positioning the pipe at different docking devices on the platform;
   b) a funnel (4), with a docking collar, at the inlet of the conveying pipe;
   c) a ceiling centering means (2) above the funnel and having a sensor (3) adapted to detect funnel docking, the docking collar being configured to mount onto the ceiling centering means;

d) a flushing tube (5*b*) in flow communication with the conveying pipe and having a tube lifting/lowering device connected to the flushing tube; and e) a lifting/moving device (7, 8) selectively below the outlet of the flushing tube for removal of a bottom cover away from the outlet of the flushing tube.

2. The conveying device according to claim 1, wherein sensors are attached to at least one of flanges or mating flanges of the conveying pipe.

3. The conveying device according to claim 2, wherein the sensors are configured to detect correct docking of the flanges and transmit indicia to allow flushing.

4. The conveying device according to claim 1, wherein the conveying pipe is arranged on the mobile frame for transporting the conveying pipe to different filling points on the platform.

5. The conveying device according to claim 4, wherein the lifting/lowering devices are assisted by pneumatic drives.

6. The conveying device according to claim 1, wherein the mobile frame includes a brake and, when the bottom cover is being removed, the brake is activated.

7. The conveying device according to claim 6, wherein the brake is released when an initiator at a lifting magnet does not detect the bottom cover.

8. The conveying device according to claim 6, characterized in that the brake is only released when the initiator at the lifting magnet does not detect a bottom cover.

9. The conveying device according to claim 1, wherein the platform is configured to be moved by electrical drives.

10. The conveying device according to claim 1, wherein the ceiling centering means is configured to position the conveying pipe.

11. The conveying device according to claim 1, wherein the ceiling centering means is configured to be sealed to the funnel upon funnel docking.

12. The conveying device according to claim 1, wherein the platform is configured to be moved by movable drives.

\* \* \* \* \*